No. 787,345. PATENTED APR. 11, 1905.
R. F. SCHUCHARDT.
PHASE ROTATION INDICATOR.
APPLICATION FILED MAY 13, 1904.
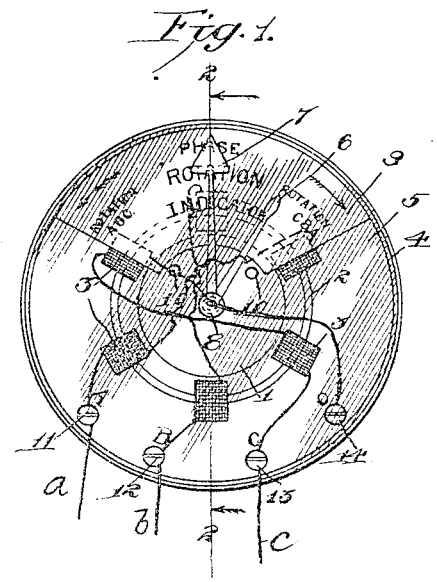
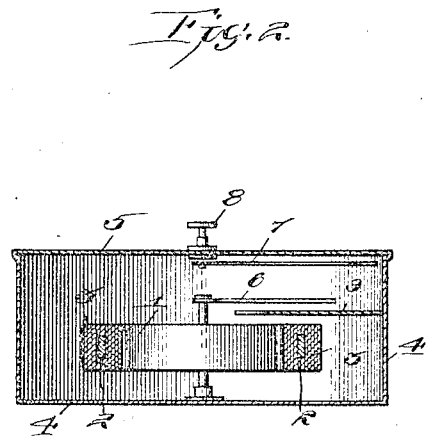
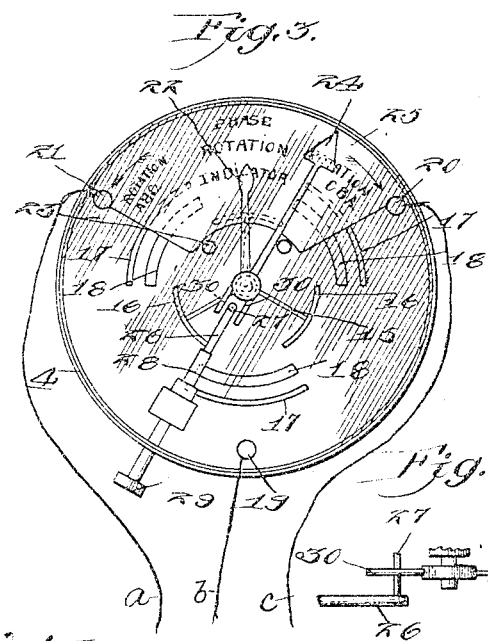
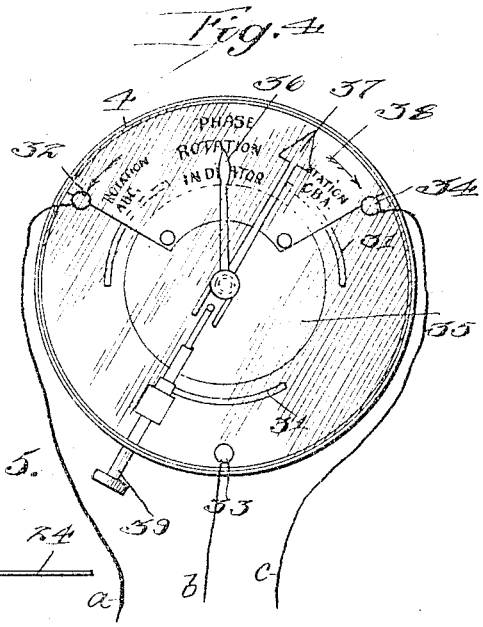
Witnesses:
G. V. Dornarus.
J. C. Lee
Inventor:
Rudolph F. Schuchardt.
by A. Miller Belfield
Atty.

No. 787,345.

Patented April 11, 1905.

UNITED STATES PATENT OFFICE.

RUDOLPH F. SCHUCHARDT, OF CHICAGO, ILLINOIS.

PHASE-ROTATION INDICATOR.

SPECIFICATION forming part of Letters Patent No. 787,345, dated April 11, 1905.

Application filed May 13, 1904. Serial No. 207,858.

*To all whom it may concern:*

Be it known that I, RUDOLPH F. SCHUCHARDT, a citizen of the United States, residing at Chicago, in the county of Cook and State of Illinois, have invented a certain new and useful Improvement in Phase-Rotation Indicators, of which the following is a full, clear, concise, and exact description, reference being had to the accompanying drawings, forming a part of this specification.

My invention relates to means for indicating the relative sequence of phases in three-phase or other polyphase circuits or, as it may be called, "indicating the phase rotation." In polyphase systems it is well known that the phases follow each other in a certain sequence or, in other words, have a certain phase rotation according to the direction of rotation of the generator, the sequence being in one order or the phase rotation being in one direction when the generator is rotated in one direction and in the reverse order or rotation when the generator is operated in an opposite direction. It is often found desirable to ascertain the phase sequence or rotation in a polyphase circuit. For example, where it is desired to connect two generators together to feed the same system it is essential, of course, that the generators be so connected that they shall impress the same phase sequence or relationship upon the circuit which they are both to feed. It is obvious that it will be disastrous to connect the two generators to the circuit with a different phase relationship even though they should be synchronized upon one of the conductors or wires of the plurality of wires going to make up the polyphase circuit. It is therefore desirable to ascertain the phase sequence or rotation of both generators, so that they may be connected with the circuit with a corresponding phase relationship or rotation. As another example it is generally desirable to have a motor rotate in a certain direction, and not only that, but it would often be injurious to have the motor rotated, even to a slight extent, in the wrong direction. In such case it is again desirable to know the phase sequence or rotation of the circuit in order that the motor can be connected properly to rotate in the right direction from the very start.

It is the object of my invention to provide a device by which the phase sequence or rotation can be automatically indicated. To such end I provide a device which has a moving part subject to the influences of the energy of a polyphase circuit and adapted to move in opposite directions, according as the phase sequence or rotation is in one order or direction or another. In the form of device which I show herein for carrying out my invention the movable part is in the form of a rotary member, and this is conveniently provided with a pointer or finger which moves as the movable member moves and which will thus swing or turn to one side or the other, according as the phase rotation is in one direction or the other. I also desirably provide an index which can be moved manually to indicate the direction in which the movable member has indicated to preserve, as it were, a record of the indication after it has been made and the instrument disconnected. Thus where it is desired to ascertain the phase sequence in the leads of two different generators to see if they correspond an indication can be made upon the instrument and the index set in accordance with that indication, and then the instrument can be disconnected from the leads of such generator and connected with those of another, and when the indication of the other is made the indication made by the first one will be known from the index, and it can be readily seen whether or not this corresponds with the direction of phase rotation of the second generator. The device is also desirably provided with a suitable card or tablet bearing suitable inscriptions to indicate the direction of phase rotation shown by the movement of the hand or pointer.

In the accompanying drawings, Figure 1 is a top plan of a device embodying my present invention. Fig. 2 is a cross-section taken on line 2 2 in Fig. 1. Figs. 3 and 4 are top plan views of modified forms of the invention, and Fig. 5 is a view of a detail of construction.

The device shown in Figs. 1 and 2 for carrying out the invention is a device operating on the principle of an induction-motor and to such end is provided with a rotary armature 1 and an inductively-related field 2, with coils 3 3, all confined within a casing 4, having a top 5. The armature 1 is provided with a pointer or finger 6, which rotates with said armature, and the top 5 is provided with an index 7 in the form of a finger or pointer, and this can be turned by hand by means of a manually-operable spindle 8, mounted in the top 5. Below the rotary finger 6 is a card or tablet 9, which is provided with inscriptions, as shown in Fig. 1. Stops 10 10 are provided to limit the movement of the pointer or finger 6. Four binding-posts 11, 12, 13, and 14 are provided, the posts 11, 12, and 13 for the three wires of a polyphase system and the post 14 for a neutral wire. This device will operate as follows: The three wires or leads $a\,b\,c$ of a three-wire system, for example, will be connected with the binding-posts 11, 12, and 13, and when the circuit is closed through the instrument the finger or pointer 6 will be swung to one side or the other of the central or zero position, according to the sequence of the phases or the direction of phase rotation. If the pointer moves to the right, as shown in Fig. 1, the phase rotation will be in one direction, which will be indicated by the letters "C B A"—that is, from lead "C" to "B" to "A." This means from "C" to "B" to "A." If, on the other hand, the pointer swings to the left—that is, to the other side of the card—the sequence of phases will be in their reverse order—that is, the phase rotation will be "A B C" instead of "C B A." Thus the direction of movement of the pointer 6 will indicate the sequence of phases of the system. The movement of the pointer is limited by the stops 10 10, so as to prevent it from setting up a rotation. If now it is desired to learn whether or not the phase rotation of two polyphase systems is the same, taking the conductors in the same order, the conductors from one generator will be first connected to the binding-posts 11, 12, and 13 and the direction of phase rotation ascertained, as above set forth. The index 7 will then be moved by hand to the side to which the pointer 6 is moved. The instrument will then be disconnected from the first generator and connected with the second with the conductors in the same relative order. If now the pointer 6 again moves in the same direction, (which direction will be indicated by the stationary index 7,) the sequence of phases in the two systems will obviously correspond. If, on the other hand, the pointer 6 moves in the opposite direction, this will indicate that the phase rotation of the second generator is opposite to that of the first. Hence if it is desired to connect the two systems together with corresponding phase rotations it will be necessary to interchange any two of the conductors of either system. To secure sequence of any two leads where a neutral connection is available, the phases are connected to any two of "A B C" posts and the neutral lead to post "O."

The device shown in Fig. 3 is an electrostatic motor—that is, a motor having a rotary element operable electrostatically by a three-phase or other polyphase system. The device shown comprises a rotary element or rotor constructed with three spokes 15 15 15, provided at their ends with segments 16 16 16 and three stationary wing-segments 17 17 17, mounted one hundred and twenty degrees from one another. In the normal position the segments 16 16 16 are midway between the wings 17 17 17. Inside of the wing-segments 17 17 are three segments 18 18 18 of insulation. Three binding-posts 19, 20, and 21 are provided and connected, respectively, with the three wing-segments 17 17 17, and the rotor is connected to the neutral. The rotor is provided with a finger or pointer 22, whose movement is limited by stops 23 23, as in the case of the previously-described instrument, and an index 24 and card 25, similar to those of the aforesaid instrument, are provided. A device for manually swinging the index 24 is provided, the same conveniently consisting of a spindle 26, having an upturned end 27 and mounted in a sleeve or bearing 28, so as to permit of its being rocked manually by a milled thumb-wheel 29 outside of the casing of the device. The upturned end 27 is located between prongs 30 30, attached to the index 24, so that by a turning movement of the spindle 26 in one direction or the other the index 24 will be turned to one side or the other. The operation of this device is substantially the same as that of Figs. 1 and 2. By connecting the three wires of the three-phase system to the binding-posts 19, 20, and 21, respectively, the rotor, with its finger 22, is caused to rotate to one side or the other of the middle position, and thereby indicate the direction of phase rotation. When desired, the index 24 is used to secure or ascertain the relative phase rotation of two or more different systems by being set after the indication of one of such systems has been made.

The device shown in Fig. 4 is a device operating on the principle of a dielectric hysteresis motor. It is constructed with three wing-segments 31 31 31, which are connected with binding-posts 32, 33, and 34. The device is provided with a centrally-mounted rotary disk 35 of mica or similar material, the arrangement being such that when the three conductors of the three-phase system are connected with the binding-posts 32, 33, and 34 the mica disk is caused to rotate or turn in one direction or another, according to the phase rotation of the system. The mica rotor 35 is provided with a pointer or finger 36, which turns with it, and an index 37 and card 38 are provided, as in the case of the preceding devices. The index 37 is arranged to be turned manually by a spindle 39, similar to the spindle 26 of the device of Fig. 3. The use of this device of Fig. 4 is similar to that of the two foregoing devices, the finger 36 being turned or swung to one direction or the other, according as the phase rotation is in one way or the other, and the index 37 is employed, as previously set forth, in connection with the other devices.

The three devices hereinabove set forth are shown for the purpose of illustrating the principle of operation of my present invention. It will be understood that other devices operable by a polyphase system can be employed without departing from the spirit of the invention and also that changes and modifications can be made in the devices herein set forth and described without causing such a departure.

It will be seen that the devices are simple and inexpensive and can be employed to great advantage wherever desired and that their use permits the instantaneous and ready ascertainment of the sequence of phases either actually or relatively in one or more polyphase systems.

What I claim is—

1. A device of the class specified, comprising means operable by the energy of a polyphase system, and means whereby such operation can be interpreted to indicate the direction of phase rotation with reference to the leads of said system, substantially as described.

2. A device of the class specified, comprising a movable member, means whereby said member is moved in different directions by the energy of polyphase systems, and means whereby such different movements can be interpreted to indicate the direction of phase rotation with reference to the leads of said system, substantially as described.

3. A device of the class specified, comprising a rotary member, means whereby said member can be given a rotative movement in one direction or another according to the direction of phase rotation, and means whereby such rotative movements can be interpreted to indicate the direction of phase rotation with reference to the leads of said system, substantially as described.

4. A device of the class specified, comprising a rotary member, means whereby said member can be rotated in opposite directions according to the direction of phase rotation, a pointer carried by said rotary member, and a card or tablet bearing inscriptions to indicate the direction of phase rotation relatively to the leads of the system according as the pointer moves in one direction or the other, substantially as described.

5. A device of the class specified, comprising a rotary member, means whereby said member can be rotated in opposite directions according to the direction of phase rotation, a pointer carried by said rotary member, a card or tablet bearing inscriptions to indicate the phase rotation according as the pointer moves in one direction or the other, and a manually-operable index adapted to be set to indicate the direction in which the pointer has moved, substantially as described.

6. A device of the class specified, comprising a rotary member carrying a pointer, means whereby polyphase energy will give said rotary member a rotative movement in one direction or another according to the direction of phase rotation, a card bearing inscriptions to indicate the direction of phase rotation, an index in the form of a centrally-mounted rotary finger, and means for manually turning said finger, substantially as described.

7. A device of the class specified, comprising inductively-related members, one of which is mounted for rotation relative to the other, and means whereby the rotary movement of said member in opposite directions, can be interpreted to indicate the direction of phase rotation relatively to the leads of the system, substantially as described.

8. A device of the class specified, comprising an inductively-related field and armature, a pointer carried by the armature, and a card or tablet indicating the direction of phase rotation relatively to the leads of the system, substantially as described.

9. A device of the class specified, comprising an inductively-related field and armature, a pointer carried by the armature, a card or tablet indicating the direction of phase rotation relatively to the leads of the system, and stops for limiting the movement of the armature in opposite directions, substantially as described.

10. A device of the class specified, comprising an inductively-related field and armature, a pointer carried by the armature, a card or tablet indicating the direction of phase rotation which causes movement of the armature in opposite directions, and an index for marking the direction of movement of said pointer, substantially as described.

11. A device of the class specified, comprising an inductively-related field and armature, a pointer carried by the armature, a card or tablet indicating the direction of phase rotation which causes movement of the armature in opposite directions, stops for limiting the movement of the armature in opposite directions, and an index for marking the direction of movement of said pointer, substantially as described.

In witness whereof I hereunto subscribe my name this 30th day of April, A. D. 1904.

RUDOLPH F. SCHUCHARDT.

Witnesses:
A. MILLER BELFIELD,
I. C. LEE.